United States Patent
Quarta et al.

(10) Patent No.: US 10,455,422 B2
(45) Date of Patent: Oct. 22, 2019

(54) VEHICLE ASSEMBLY

(71) Applicant: FORD GLOBAL TECHNOLOGIES, LLC, Dearborn, MI (US)

(72) Inventors: Markus Quarta, London (GB); Marcus Hoggarth, Hertfordshire (GB)

(73) Assignee: Ford Global Technologies, LLC, Dearborn, MI (US)

( * ) Notice: Subject to any disclaimer, the term of this patent is extended or adjusted under 35 U.S.C. 154(b) by 66 days.

(21) Appl. No.: 15/843,731

(22) Filed: Dec. 15, 2017

(65) Prior Publication Data

US 2018/0176783 A1 Jun. 21, 2018

(30) Foreign Application Priority Data

Dec. 15, 2016 (GB) .................................. 1621357.1

(51) Int. Cl.
| | |
|---|---|
| *H04M 1/66* | (2006.01) |
| *H04W 12/08* | (2009.01) |
| *B60R 16/023* | (2006.01) |
| *H01Q 1/32* | (2006.01) |
| *H05K 9/00* | (2006.01) |
| *H01Q 1/44* | (2006.01) |
| *H01Q 1/52* | (2006.01) |
| *H04W 12/02* | (2009.01) |

(Continued)

(52) U.S. Cl.
CPC ........... *H04W 12/08* (2013.01); *B60R 16/023* (2013.01); *H01Q 1/3233* (2013.01); *H01Q 1/3291* (2013.01); *H01Q 1/44* (2013.01); *H01Q 1/526* (2013.01); *H04W 12/02* (2013.01); *H05K 9/0007* (2013.01); *H05K 9/0071* (2013.01); *H01Q 1/3275* (2013.01); *H04L 63/1475* (2013.01); *H04W 12/12* (2013.01)

(58) Field of Classification Search
USPC ................ 455/418, 67.12; 340/575; 343/713
See application file for complete search history.

(56) References Cited

U.S. PATENT DOCUMENTS

| | | | |
|---|---|---|---|
| 6,204,480 B1 | 3/2001 | Woodard et al. | |
| 6,229,434 B1 * | 5/2001 | Knapp | B60Q 1/00 307/10.1 |

(Continued)

FOREIGN PATENT DOCUMENTS

| | | |
|---|---|---|
| DE | 19711175 A1 | 9/1998 |
| JP | 2007264436 A | 10/2007 |

(Continued)

OTHER PUBLICATIONS

Search Report for Application No. GB1621357.1 dated May 25, 2017.

*Primary Examiner* — David Q Nguyen
(74) *Attorney, Agent, or Firm* — Jennifer M. Stec; Brooks Kushman P.C.

(57) ABSTRACT

A vehicle assembly is provided. The vehicle assembly comprises: one or more body frame components configured to define an interior of the vehicle; and one or more windows provided within apertures formed in the body frame components, each window comprising one or more first electrically conductive elements, wherein the first electrically conductive elements are configured to selectively limit transmission of electromagnetic waves within the interior of the vehicle.

19 Claims, 3 Drawing Sheets

(51) Int. Cl.
*H04L 29/06* (2006.01)
*H04W 12/12* (2009.01)

(56) References Cited

U.S. PATENT DOCUMENTS

| | | | | |
|---|---|---|---|---|
| 8,629,375 B2* | 1/2014 | Pinto, IV | ............... | H05B 3/84 |
| | | | | 134/198 |
| 2005/0195994 A1* | 9/2005 | Saito | ............... | G10L 21/0208 |
| | | | | 381/102 |
| 2006/0270354 A1 | 11/2006 | de La Chapelle et al. | | |
| 2006/0270470 A1 | 11/2006 | de La Chapelle et al. | | |
| 2007/0267290 A1* | 11/2007 | Richardson | ............... | B60L 8/00 |
| | | | | 204/196.1 |
| 2008/0204256 A1* | 8/2008 | Omi | ............... | B60K 28/066 |
| | | | | 340/575 |
| 2008/0246671 A1* | 10/2008 | Takaba | ............... | H01Q 1/1271 |
| | | | | 343/713 |
| 2009/0235588 A1* | 9/2009 | Patterson | ............... | G01V 3/088 |
| | | | | 49/26 |
| 2011/0014863 A1 | 1/2011 | Foster | | |
| 2013/0225092 A1* | 8/2013 | Chalmers | ............... | H04W 4/04 |
| | | | | 455/67.12 |
| 2013/0226092 A1 | 8/2013 | Chalmers et al. | | |
| 2013/0228365 A1* | 9/2013 | Uprety | ............... | B32B 17/10 |
| | | | | 174/257 |
| 2015/0171510 A1* | 6/2015 | Hirose | ............... | H01Q 1/3241 |
| | | | | 343/713 |
| 2015/0249741 A1* | 9/2015 | Fischer | ............... | H04L 67/125 |
| | | | | 455/418 |
| 2017/0251391 A1* | 8/2017 | Kinthada Venkata | ............... | |
| | | | | H04L 67/12 |

FOREIGN PATENT DOCUMENTS

JP        1767494 B2    6/2011
WO        WO-9638873 A1 * 12/1996 ........... H01Q 1/285

* cited by examiner

VEHICLE ASSEMBLY

CROSS-REFERENCE TO RELATED APPLICATIONS

This application claims foreign priority benefits under 35 U.S.C. § 119(a)-(d) to GB Application 1621357.1 filed Dec. 15, 2016, which is hereby incorporated by reference in its entirety.

TECHNICAL FIELD

The present disclosure relates to a vehicle assembly and is particularly, although not exclusively, concerned with a vehicle assembly configured to improve privacy for occupants of the vehicle.

BACKGROUND

When conducting important conversations and meetings, it can be desirable to limit disruptions or distractions caused by personal communications devices, such as mobile telephones and portable computing devices. It may therefore be desirable to prevent the portable communications devices from receiving wireless signals from outside of a meeting venue whilst the meeting is being conducted.

Additionally, if the topics of the discussion or the information being exchanged during the meeting is of a sensitive or confidential nature, it may be desirable to control the use of communication devices at the meeting venue or prevent such devices from sending and/or receiving wireless signals outside the meeting venue.

SUMMARY

According to an arrangement of the present disclosure, there is provided a vehicle assembly comprising: one or more body frame components configured to define an interior of the vehicle assembly; and at least one window provided within corresponding apertures formed in or between the body frame components, the window comprising at least one first electrically conductive element, wherein the first electrically conductive element is configured to selectively permit transmission of electromagnetic waves, e.g. radio waves and/or microwaves, between inside and outside the vehicle interior.

In other words, the first electrically conductive element may be configured to limit the transmission of electromagnetic waves into and out of the interior of the vehicle. Additionally or alternatively, the first electrically conductive element may be configured to interfere with the production of electromagnetic waves within the vehicle interior.

The first electrically conductive element may be selectively connectable, e.g. electrically connectable, to one or more of the body frame components. The first electrically conductive element may be electrically connected to the body frame components at or along one, more than one or each of the edges of the window. The body frame components may be electrically conductive.

The first electrically conductive element may be connectable to the body frame components at each edge of the aperture.

The first electrically conductive element may be configured to form a mesh or layer over an area of the window, e.g. an area of the window within the aperture or the complete area of the window. The window may comprise a plurality of first electrically conductive elements configured to form the mesh. The plurality of first electrically conductive elements may be electrically connected to one another.

The first electrically conductive element may be configured to attenuate electromagnetic waves passing through the window. Additionally or alternatively, the first electrically conductive element may be configured to generate electromagnetic radiation in order to interfere with the transmission and reception of electromagnetic waves.

The vehicle assembly may further comprise an interference generator electrically connected to the first electrically conductive element. The interference generator may be configured to pass a current through the first electrically conductive element in order to generate the electromagnetic radiation.

The first electrically conductive element may be configured to generate electromagnetic radiation at a frequency that is substantially equal to a frequency of electromagnetic waves that it is desirable to interfere with, e.g. the transmission or reception of which it is desirable to interfere with within the interior of the vehicle.

The first electrically conductive element may be configured to generate electromagnetic radiation at a frequency that induces electrical currents in electronic devices within the interior of the vehicle in order to disrupt their operation.

The body frame components may be electrically connected to one another, e.g. directly or indirectly via another body frame component.

Each of the body frame components may comprise at least one second electrically conductive element. The second electrically conductive element may be configured to limit, e.g. selectively limit, transmission of electromagnetic waves through the body frame component.

For example, the second electrically conductive element may be configured to attenuate electromagnetic waves passing through the body frame components. The body frame components and the window may be configured to substantially prevent electromagnetic waves from leaving or entering the interior of the vehicle.

The first electrically conductive element may be selectively connectable to the second electrically conductive element.

The body frame components may comprise a door of the vehicle and one or more other body frame components. The door and/or the other body frame components may be configured such that the door is electrically connected to the other body frame components adjacent to the door. The door may be electrically connected to the other body frame components at or along the length of each edge of the door, e.g. the when the door is closed.

The assembly may further comprise one or more door seals provided between the door and one or more of the other body frame components. The door seals may comprise at least one third electrically conductive element configured to electrically connect the door to an adjacent body frame component, e.g. such that the electrical connection between the door and the adjacent body frame components is not affected by the presence of the seal.

The door seals may be provided on the door and/or the other body frame components. The door may contact the adjacent body frame component at the door seal. In other words, when the door is closed, the door may not be in direct contact with the adjacent body frame component along one or more edges of the door.

The body frame components and the window may be electrically connected to one another, such that the body frame components and the window form an electrically conductive cage substantially surrounding the interior of the vehicle.

In other words, the body frame components and the windows may be configured to form a Faraday cage around the interior of the vehicle. The body frame components or second electrically conductive element and the first electrically conductive element may form members of the electrically conductive cage.

The body frame components and the windows may be selectively connectable.

The body frame components, e.g. the door, doors seals and/or any of the other body frame components, and the window may be configured such that gaps between members of the cage are less than or equal to a predetermined distance. The gaps may relate to a straight line distance between locations on adjacent members of the cage.

The predetermined distance may be set according to a wavelength of electromagnetic waves that it is desirable to limit or attenuate. For example, the predetermined distance may be between a tenth and a twentieth of the wavelength of electromagnetic waves that it is desirable to attenuate. Alternatively, the predetermined distance may be any other fraction or multiple of the wavelength.

The vehicle assembly may further comprise an electromagnetic pulse generator configured to selectively emit a pulse of electromagnetic radiation or generate a magnetic field, e.g. a rapidly changing magnetic field, within the vehicle interior. The electromagnetic pulse generator may comprise an electrostatic discharge device, an electric circuit switching device and/or any other device configured to generate an electromagnetic pulse.

The body frame components and the window may be configured to substantially prevent the electromagnetic radiation or magnetic field generated by the electromagnetic pulse generator passing outside of the vehicle interior.

The vehicle assembly may further comprise a storage compartment. Walls of the storage compartment may comprise at least one fourth electrically conductive element. The fourth electrically conductive elements may substantially surround the storage compartment. The fourth electrically conductive elements may be configured to substantially prevent electromagnetic radiation and magnetic fields from passing through the walls of the storage compartment, e.g. when the storage compartment is closed. The storage compartment may be a boot or trunk of the vehicle, or may be an internal storage compartment provided within the vehicle interior. The storage compartment may be accessible from within the vehicle interior.

The vehicle assembly may comprise an internal wireless transmitter-receiver configured to transmit or receive wireless signals within the vehicle interior. The vehicle assembly may further comprise an external wireless transmitter configured to selectively transmit or receive the wireless signals outside of the vehicle interior, such that the wireless signals may be relayed between the vehicle interior and exterior.

The vehicle assembly may further comprise a controller, configured to determine which of the received wireless signals are to be retransmitted by the internal and/or external wireless transmitter-receivers.

The controller may be configured to determine which of the received wireless signals are to be retransmitted based on: an intended recipient of the wireless signal; an identity of a device that generated the wireless signals; data contained within the wireless signals, e.g. the type of data being transmitted; a communication protocol of the wireless signals; authorization date received by the external wireless transmitter-receiver and/or authorization data received by the internal wireless transmitter-receiver.

For example, the controller may be configured to allow signals using a Wi-Fi or BLUETOOTH protocol to be retransmitted, but may prevent signals using a Global System for Mobile Communications (GSM), Universal Mobile Telecommunications System (UMTS), Long-Term Evolution (LTE) or any other cellular data transmission protocol from being retransmitted. The controller may be configured to identify emergency signals and allow the emergency signals to be retransmitted.

The first electrically conductive element may comprise a heating element for the window, e.g. provided as part of a heated window system of the vehicle.

The first electrically conductive element may be configured to change its shape under an external stimulus from a first shape, in which the first electrically conductive elements limit transmission of electromagnetic waves through the window, to a second shape in which the first electrically conductive element permits transmission electromagnetic waves through the window. For example, the first electrically conductive element may comprise a shape memory alloy, such as nitinol.

The vehicle assembly may further comprise a speaker configured to project audio noise within the interior of the vehicle. The noise may be configured to obscure voices of the occupants of the vehicle in an audio recording made within the interior of the vehicle. The speaker may be configured to project randomly generated noise, such as white noise or pink noise. Additionally or alternatively, the speaker, or a further speaker, may be configured to project the audio noise within the storage compartment.

The speaker may be configured to project the audio noise at a volume equal to or greater than a volume at which an occupant of the vehicle is speaking.

The vehicle assembly may comprise a body imaging device configured to scan an occupant of the vehicle and identify devices, e.g. electronic devices such as telecommunications devices or photographic devices, being carried by the occupant, e.g. being carried in pockets of the occupants clothing or worn on a belt, strap or lanyard.

The vehicle assembly may further comprise a wireless transmission detector provided within the vehicle interior and configured to inform an occupant of the vehicle if a wireless signal is detected within the vehicle interior.

The window may comprise an internal antenna provided at an internal surface of the window and an external antenna provided at an external surface of the window. The internal antenna may be selectively couplable to the external antenna.

The first electrically conductive element, or a further electrically conductive element of the window, may be configured to form a switch that selectively couples the internal antenna to the external antenna.

To avoid unnecessary duplication of effort and repetition of text in the specification, certain features are described in relation to only one or several aspects or embodiments of the invention. However, it is to be understood that, where it is technically possible, features described in relation to any aspect or embodiment of the invention may also be used with any other aspect or embodiment of the invention.

For a better understanding of the present disclosure, and to show more clearly how it may be carried into effect, reference will now be made, by way of example, to the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
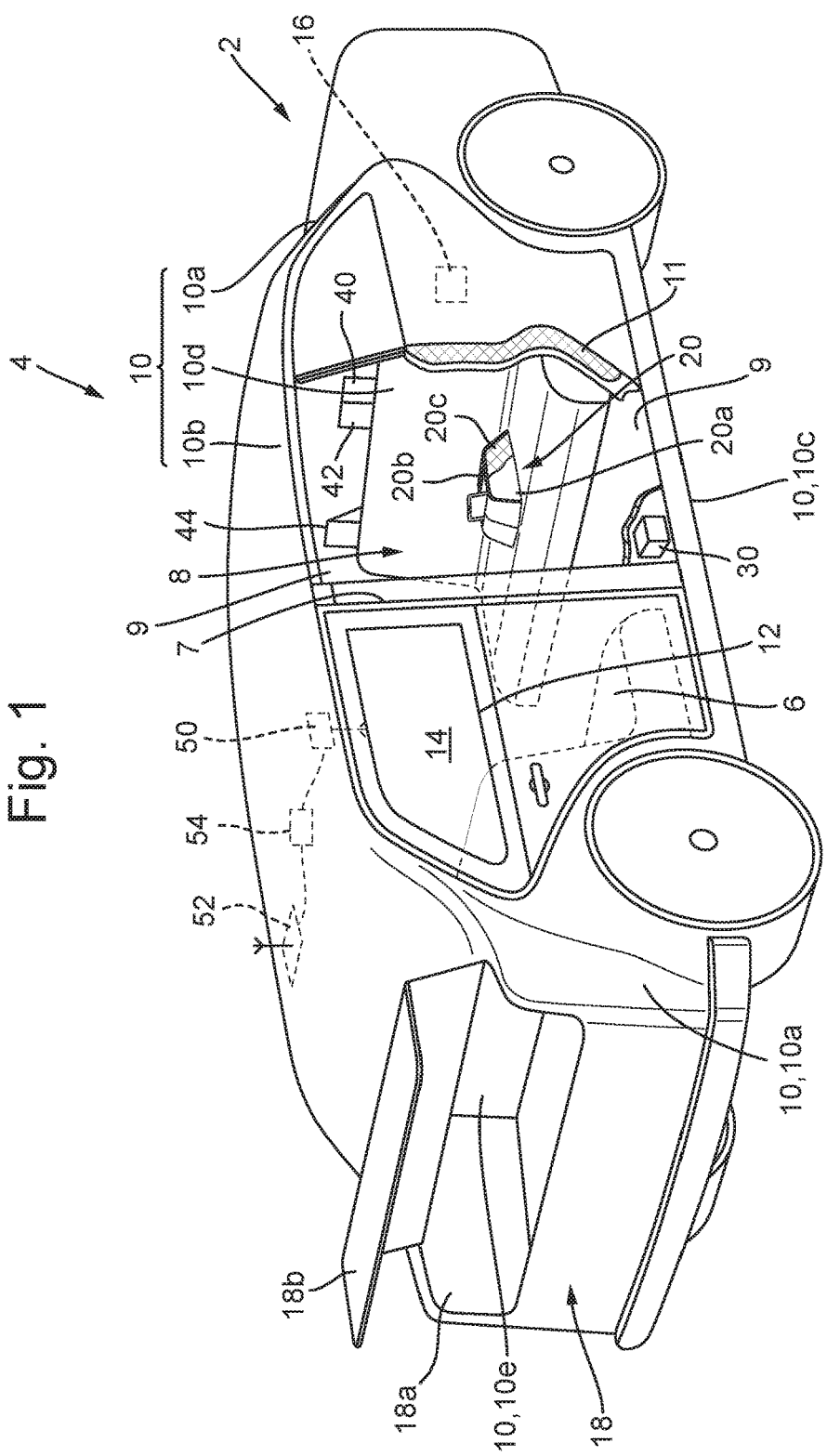
FIG. 1 shows a vehicle according to arrangements of the present disclosure.

With reference to FIG. 1, a vehicle 2, such as a motor vehicle, comprises a vehicle body 4 having one or more body frame components 10. For example, the vehicle body may comprise one or more side panels 10a, roof panels 10b and floor panels 10c. The vehicle body may further comprise front and rear bulkheads 10d, 10e, that separate an interior 8 of the vehicle from the drive train of the vehicle, storage compartments, such as a boot/trunk 18, and/or a crash structure of the vehicle.

The body frame components 10 of the vehicle may define the interior 8 of the vehicle. Interior trim portions 9 may be coupled to inner surfaces of the body frame components in order to improve the appearance and comfort of the vehicle interior.

One or more of the body frame components 10 may comprise apertures 12. Windows 14 may be provided within each of the apertures. The windows may be fixed in place relative to the body frame components. Alternatively, the windows 14 may be movable, e.g. slidable, relative to the body frame components in order to open and close the windows of the vehicle.

The components of the vehicle, e.g. the body frame components 10 and the windows 14, may be configured to form a Faraday cage around the interior 8 of the vehicle. A Faraday cage is a structure formed from a plurality of electrically conductive elements that are configured to substantially enclose a volume inside the cage. When an external electrical field impinges on the Faraday cage, electrical charges within the electrically conductive element are distributed such that the effect of the electrical field is cancelled out within the volume inside the cage. The Faraday cage can thereby be configured to substantially prevent electromagnetic radiation from passing into or out of the internal volume of the Faraday cage. Electromagnetic radiation passing through walls of the cage may be significantly attenuated.

The level of attenuation may depend on the size of any gaps present between the electrically conductive elements forming members the cage. Performance of the Faraday cage may be improved by minimizing the gaps between members of the cage. It may be desirable for the size of the gaps, e.g. the distance spanning the gaps, to be less than the wavelength of the electromagnetic radiation that it is desirable to attenuate. For example, it may be desirable for the size of the gaps, e.g. the maximum distance spanning the gaps, to be between one tenth and one twentieth of the wavelength. The components of the vehicle may be configured such that the size of gaps present between members of the Faraday cage is less than or equal to a predetermined distance.

The body frame components 10 may comprise one or more electrically conductive elements configured to form the Faraday cage. As depicted in FIG. 1, the body frame components may comprise a plurality of electrically conductive elements 11 configured to form a grid or mesh over the area of the body frame component. The electrically conductive elements 11 may be provided in a layer of the structure of the body frame component. The electrically conductive elements may be configured such that a gap size of the mesh is less than or equal to the predetermined distance.

In some arrangements, a single electrically-conductive member may be provided that extends over substantially the total area of the body frame component, e.g. between each of the adjacent body frame components. In such arrangements, the electrically-conductive elements may comprise a sheet of electrically-conductive material. The sheet may form a layer of the body frame component 10. In other arrangements, one or more of the body frame components 10 may be electrically conductive and may themselves form members of the Faraday cage.

As described above, the maximum desirable size of any gaps present between the electrically conductive elements may be determined according to a wavelength of radiation that it is desirable to block or attenuate. For example, it may be desirable to block signals from mobile telephones at a frequency equal to or less than 2600 Megahertz (MHz), hence the predetermined distance may be less than 11.5 millimeters (mm), such as 5.75 mm.

The body frame components 10 may be electrically coupled to the other body frame components that are adjacent to them. If the body frame components comprise electrically conductive elements 11 configured to form the Faraday cage, the electrically conductive elements 11 may be electrically connected to the adjacent body frame component 10 or to the electrically conductive elements 11 provided on the adjacent body frame component. For example, side panel 10a and roof panel 10b may each comprise a plurality of electrically conductive elements 11. Each of the electrically conductive element 11 provided on the side panel 10a may be electrically connected to one or more electrically conductive elements provided on roof panel 10b.

The body frame components 10 and/or electrically conductive elements 11 may be connected such that a gap in the Faraday cage formed between the body frame component and each adjacent body frame component is less than or equal to the predetermined distance. The gap size between members of the Faraday cage may therefore be less than or equal to the predetermined distance. The body frame component 10 may be electrically connected to the adjacent body frame component at one or more of locations. In the case of there being a plurality of electrical connections, the locations of the electrical connections may be separated by less than the predetermined distance, e.g. around the perimeter of the body frame component. Alternatively, there may be a substantially continuous electrical connection between the body frame component and the adjacent body component along the edge of the body frame component.

One or more of the side panels 10a may be configured to form doors 6 of the vehicle. The doors 6 may be movably coupled, e.g. pivotally and/or slidably coupled, to the other of the side panels 10a or the other body frame components 10 adjacent to the door 6. The door 6 may be moved relative to the adjacent body frame component, in order to open and close the door 6.

When the door is opened, the door 6 and/or the electrically conductive element 11 provided in the door may remain or may no longer be electrically connected to the adjacent body frame components 10 and/or electrically conductive element provided in the adjacent body frame components along one or more sides of the door 6. However, opening the door 6 may create a gap in the Faraday cage of a size that is greater than the predetermined distance. When the door is closed, it may be desirable to reconnect the members of the Faraday cage between the door and the adjacent body frame components 10 in order to restore the performance of the Faraday cage.

The vehicle 2 may be provided with one or more door seals 7. The door seals 7 may be coupled to the door 6, or to the body frame component 10 adjacent to the door 6. When the door 6 is closed, the door seals 7 may be arranged between the door 6 and the adjacent body frame components at or along one or more edges of the door 6. The door seals 7 may be configured to create a seal between the door and the adjacent body frame component. The door seals 7 may be predominantly formed from a polymer material, such as a rubber material. Hence, the door seals 7 may not be electrically conductive.

In order to prevent the inclusion of the door seal 7 from reducing the performance of the Faraday cage, e.g. by preventing the door 6 and/or the electrically conductive elements 11 provided in the door 6 from electrically connecting to the adjacent body frame components, the electrically conductive elements 11 may also be provided in the door seals 7. For example, the electrically conductive element provided on the door 6 or the adjacent body frame component may be extended to the door seal 7. Alternatively, the door seal 7 may be provided with electrically conductive elements that are electrically connected to the electrically conductive elements of the door 6 or adjacent body frame component.

As mentioned above, one or more of the body frame components 10 may comprise apertures 12 that house windows 14 of the vehicle (which may be at the front, side or rear of the vehicle). A distance spanning the apertures 12 in the body frame components 10 may be larger than the predetermined distance. Hence, with reference to FIG. 2, in order to ensure that performance of the Faraday cage in blocking or attenuating electromagnetic radiation is not reduced due to the presence of the apertures 12, the windows 14 may comprise one or more further electrically conductive elements 15.

The further electrically conductive elements 15 may comprise a plurality of elements, such as wires or strips, configured to form a lattice or mesh over an area of the window, e.g. an area of the window spanning the aperture 12. A particular one of the further electrically conductive elements 15 may be arranged to follow a perimeter of the window 14, or a perimeter of the aperture when the window is closed, in order to improve an electrical connection between the mesh and the body frame components. In another arrangement, the electrically conductive element 15 may comprise a layer of electrically conductive material that extends over the area of the window. In either arrangement, the further electrically conductive elements 15 may be substantially transparent to visible light, e.g. the material forming the further electrically conductive elements 15 may be transparent and/or spacings in a lattice or mesh arrangement of the further electrically conductive elements may permit the passage of light.

Figure 2:
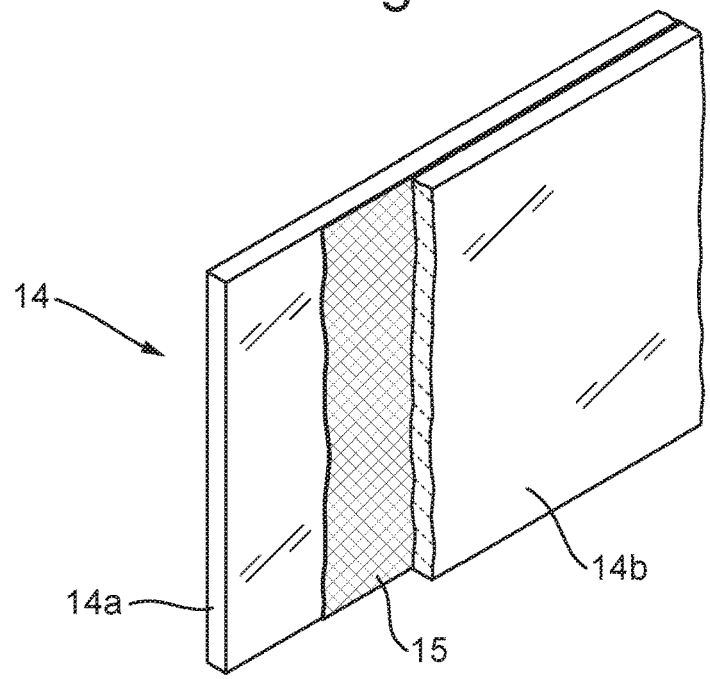
FIG. 2 is a perspective view showing the layered structure of a vehicle window according to arrangements of the present disclosure.

As depicted in FIG. 2, the window 14 may be predominantly formed from a substantially transparent material such as glass and/or a polymer. The window may comprise a plurality of layers 14a, 14b of the transparent material. The further electrically conductive element(s) 15 may be provided between the layers 14a, 14b of the transparent material.

The further electrically conductive elements 15 provided in the windows 14 may be electrically connected to the body frame components, or the electrically conductive elements provided on the body frame components. The further electrically conductive elements 15 in the window and/or the body frame components may be configured such that the windows 14 are connected to the body frame components along each edge of the window, e.g. along each edge of the aperture. The windows 14 may be electrically connected to the body frame components at one or more locations. In the case of there being a plurality of electrical connections, the location of the electrical connections may be separated by less than the predetermined distance, e.g. around the perimeter of the window 14 or aperture 15.

By providing the further electrically conductive elements 15 in the windows 14 that are electrically connected to the body frame components 10 or electrically conductive elements 11 provided on the body frame components, the Faraday cage may be capable of substantially blocking the transmission of wireless signals between the vehicle interior and an exterior of the vehicle.

In some arrangements, the further electrically conductive elements 15 provided in each of the windows 14 may be selectively connectable to the body frame components 10. By disconnecting the further electrically conductive element 15 from the body panel, the performance of the Faraday cage may be reduced, and wireless signals may be transmitted between the vehicle interior and the exterior of the vehicle. In other arrangements, the arrangement, e.g. positions, of the further electrically conductive elements 15 within the windows 14 may be selectively variable. For example, the positions of the further electrically conductive elements 15 may be selectively varied in order to increase the size of gaps between the further electrically conductive elements 15. In this way, the further electrically conductive element 15 may be selectively configured to reduce the attenuation of wireless signals that is achieved by the Faraday cage.

In some arrangements, the further electrically conductive element may be configured to change their shape and/or relative arrangement under an external stimulus, such as temperature, voltage or any other stimulus. For example, the further electrically conductive elements may be configured to change their shape or arrangement from a first condition, in which the further electrically conductive elements limit transmission of electromagnetic waves through the window, to a second condition, in which the further electrically conductive element permits transmission and reception of electromagnetic waves through the window. For example, the first electrically conductive element may comprise a shape memory alloy, such as nitinol.

Creating a Faraday cage around the interior 8 of the vehicle may passively limit the transmission and reception of electromagnetic waves from and to the interior of the vehicle. Additionally or alternatively, it may be desirable to actively interfere with electromagnetic waves within the interior of the vehicle, e.g. that are being transmitted from the interior of the vehicle or have passed into the interior of the vehicle from outside, in order to limit transmission and reception of electromagnetic waves within the interior of the vehicle.

The electrically conductive elements 11, further electrically conductive elements 15 or an additional electrically conductive element (not shown) provided on the windows 14 or body frame components 10 may be configured to generate, e.g. emit, electromagnetic radiation in order to interfere with the transmission and reception of electromagnetic waves within the vehicle interior 8.

The vehicle 2 may comprise an interference generator 16. The interference generator may be electrically connected to the electrically conductive element 11, further electrically conductive elements 15 or additional electrically conductive element and may pass a current through the element in order to generate the electromagnetic radiation. In other words, the electrically conductive elements or additional electrically conductive element may act as an antenna for the interference generator 16.

The electromagnetic radiation may be generated at a frequency or range of frequencies that is substantially equal to a frequency or a range of frequencies of electromagnetic waves that it is desirable to interfere with. For example, the electromagnetic radiation may be generated at one or more frequencies or ranges of frequencies at which mobile phone signals or other wireless communication signals are transmitted.

Additionally or alternatively, the electromagnetic radiation may be generated at a frequency selected in order to induce electrical currents in any electronic devices present within the interior of the vehicle in order to disable the devices or disrupt their operation.

In some arrangements, the additional electrically conductive element may be provided within, e.g. as part of, another system of the vehicle, such as a windscreen or rear window heating system. For example, a heating element in such a screen may also serve as the additional electrically conductive element.

The vehicle 2 may further comprise one or more storage compartments. The storage compartments may be external storage compartments, e.g. accessible from outside the vehicle, such as a boot/trunk 18. Additionally or alternatively, the vehicle may comprise one or more internal storage compartments 20, e.g. accessible from within the vehicle interior.

In either case, the storage compartment may comprise a plurality of walls 18a, 20a and a lid 18b, 20b that enclose an interior of the storage compartment. The lid 18b, 20b may be movably coupled to the storage compartment, e.g. at a hinge such that the lid 18b, 20b is rotatable about the hinge to open and close the storage compartment 18, 20. Additionally or alternatively, the lid 18b, 20b may be slidably coupled to the storage compartment and may be slidable relative to the walls 18a, 20b of the storage compartment to open and close the storage compartment.

Figure 3:
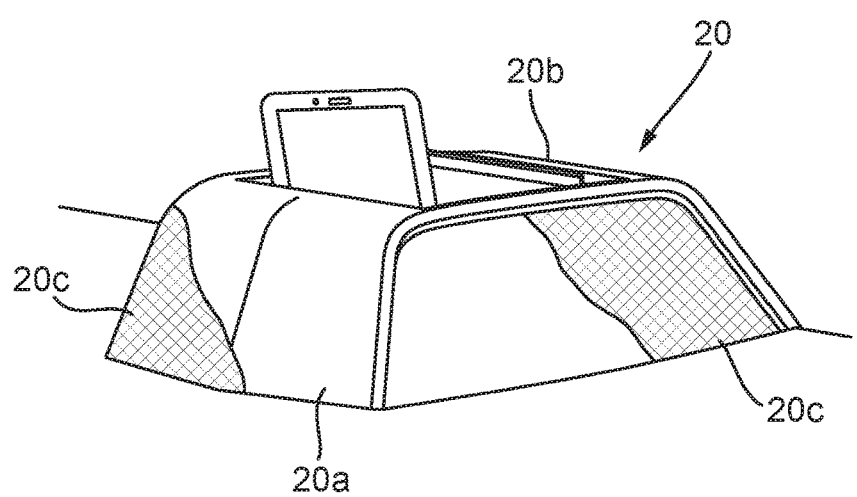
FIG. 3 shows a storage compartment for a vehicle according to arrangements of the present disclosure.

With reference to FIG. 3, the walls 20a and lid 20b may comprise one or more electrically conductive elements 20c. The electrically conductive elements may substantially surround the storage compartment 20. The electrically conductive elements 20c may form a Faraday cage surrounding the interior of the storage compartment. In this way, the electrically conductive elements 20c may substantially prevent electromagnetic radiation from passing through the walls and lid of the storage compartment 20. Although in FIG. 3 the internal storage compartment 20 is depicted, the exterior storage compartment may also be provided with electrically conductive elements configured in the same way.

Returning to FIG. 1, the vehicle 2 may further comprise an electromagnetic pulse generator 30. The electromagnetic pulse generator may be provided within the interior 8 of the vehicle and may be configured to emit a pulse of electromagnetic radiation and/or generate a rapidly varying magnetic field within the interior of the vehicle. As depicted in FIG. 1, the electromagnetic pulse generator 30 may be provided within an interior trim portion 9 of the vehicle interior 8.

The electromagnetic pulse generator 30 may comprise an electrostatic discharge device configured to generate and discharge a high voltage between terminals of the device. Additionally or alternatively, the electromagnetic pulse generator 30 may comprise an electric current switching device configured to rapidly switch an electric current through the device. Additionally or alternatively again, the electromagnetic pulse generator 30 may comprise any other suitable device capable of selectively generating an electromagnetic pulse.

As the electromagnetic pulse generator 30 is provided within the interior 8 of the vehicle, the Faraday cage formed by the body frame components 10 and the further electrically conductive elements 15 provided in the windows 14 may be configured to prevent the electromagnetic radiation and/or magnetic field from passing outside of the vehicle interior 8. Additionally, the Faraday cage formed around the storage compartment 20 provided within the interior 8 of the vehicle may prevent the electromagnetic radiation and/or magnetic field from passing into the storage compartment 20.

When occupants inside the vehicle wish to have a conversation about sensitive or confidential information, it may be desirable to ensure that the conversation is not being monitored by any electronic devices, such as electronic communications devices. The occupants may place any of their electronic devices into the storage compartments 18, 20. The occupants may then operate the electromagnetic pulse generator 30 to generate an electromagnetic pulse within the interior 8 in order to disrupt or disable, e.g. permanently disable, any electronic devices that have not been placed inside the storage compartments 18, 20. If desirable, the occupants may then remove their electronic devices from the storage compartment 18, 20. Although the electronic devices removed from the storage compartment may be operated during the conversation, the electronic devices may be prevented from transmitting or receiving wireless signals, due to the Faraday cage formed by the body frame components 10 and windows 14. Furthermore, each of the occupants may be aware of each of the electronic devices within the vehicle 2 that is operational.

In some cases, it may not be desirable to operate the electromagnetic pulse generator 30 to disable electronic devices within the vehicle interior. For example, one or more of the occupants may possess electronic devices that are too large to be placed into the storage compartment 20. In this case, it may be desirable to ensure that none of the occupants possesses any concealed devices that have not been declared to the other occupants. The vehicle 2 may comprise a body scanner 40, such a millimeter wave scanner, configured to scan an occupant of the vehicle and identify any devices being carried by the occupants.

The body scanner 40 may be provided at the door 6 of the vehicle, and may be configured to scan an occupant as they enter the vehicle. Alternatively, the scanner 40 may be configured to scan the occupant after they have entered the vehicle, for example the scanner 40 may be configured to scan an occupant sat in a seat of the vehicle. The scanner 40 may alert the other occupants if the scanned occupant may be carrying an electronic device.

Additionally or alternatively, the vehicle 2 may comprise a wireless signal detector 42 provided within the vehicle and configured to detect the presence of wireless communication signals within the vehicle and inform the occupants if any wireless signals are detected. The wireless signal detector 42 may be configured to determine the strength of any wireless signals detected within the interior 8 of the vehicle. The occupant may refer to the wireless signal detector 42 to confirm that the Faraday cage around the vehicle interior is successfully blocking electromagnetic waves from entering the vehicle interior as well as to determine that no communications devices are attempting to send signals from within the vehicle interior.

Even when the presence and operability of electronic devices within the vehicle interior 8 can be controlled by the occupants of the vehicle, it may be desirable to ensure that any devices that are present within the vehicle interior or within the storage container 20, e.g. that have been declared by occupants of the vehicle, cannot be used to record any private or confidential conversations being held within the vehicle interior.

The vehicle may comprise a speaker 44 configured to produce audio noise within the interior of the vehicle in order to disrupt audio recordings of conversations being held within the vehicle. The speaker 44 may be provided within the storage container 18, 20, in order to prevent the conversation being recorded by electronic devices that have been placed in the storage compartment 18, 20. Additionally or alternatively, the speaker 44 may be provided within the interior 8 of the vehicle and may project the audio noise within the vehicle interior.

The audio noise may be randomly generated noise, such as white noise or pink noise. Additionally or alternatively, the audio noise may comprise a mix of frequencies selected to correspond to frequencies of natural speech. The speaker 44 may be configured such that a volume of the audio noise is equal to or greater than a volume at which an occupant of the vehicle is speaking.

In some cases, it may be desirable to enable one or more wireless communication devices inside the vehicle interior 8 to send signals outside of the vehicle 2 and/or to receive signals from outside of the vehicle. The vehicle may comprise an interior transmitter-receiver 50 and an external transmitter-receiver 52, the internal and external transmitter-receivers may be configured to receive wireless signals, inside the vehicle interior 8 and outside the vehicle respectively. The internal transmitter-receiver 50 may be configured to selectively retransmit the external wireless signals within the interior of the vehicle, and the external transmitter-receiver 52 may be configured to selectively retransmit the internal wireless signals. The vehicle 2 may further comprise a controller 54 configured to determine which of the transmissions received by the interior and exterior transmitter-receivers 50, 52 are to be retransmitted.

The controller 54 may be configured to permit transmissions originating from a particular device to be retransmitted. Additionally or alternatively, the controller 54 may be configured to determine whether a transmission should be retransmitted based on the nature of the transmission, e.g. the data contained within the transmission and/or the communication protocol of the transmission. For example, the controller may be configured to allow transmissions using a Wi-Fi protocol to be retransmitted, but to prevent transmissions using a GSM, UMTS, LTE or other cellular data transmission protocol. The controller 54 may be configured to identify emergency communication signals and may allow the emergency communication signals to be retransmitted.

In some arrangements, the controller 54 may be configured to allow signals to be retransmitted based on authorization data received by the interior or exterior transmitter-receiver 50, 52. For example, authorization data may be provided within the wireless signal to be retransmitted.

In some arrangements, the controller 54, or another controller, may be configured to establish a secure communication network within the vehicle 2 to allow the communications devices within the vehicle to communicate with each other securely, e.g. in isolation from communication networks or signals outside of the vehicle.

Figure 4:
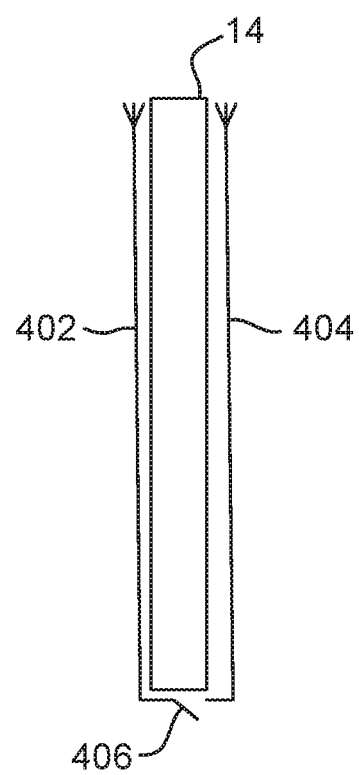
FIG. 4 is a sectional view of a window according to arrangements of the present disclosure.

With reference to FIG. 4, additionally or as alternative to providing the interior and exterior transmitter-receivers, one or more windows 14 of the vehicle may comprise an interior antenna 402 provided on an internal surface of the window 14 and an exterior antenna 404 provided on an external surface of the window 14. The interior and exterior antennas 402, 404 may be selectively connectable. For example, an electrically conductive element of the window 14 may be configured to form a switch 406 that selectively couples the interior antenna to the exterior antenna, such that signals can be passed through the window 14.

The interior antenna 402 and exterior antenna 404 may be formed by a film or thin wire arrangement, e.g. a mesh or lattice arrangement. In either case, the interior and exterior antennas 402, 404 may be transparent, e.g. substantially transparent.

It will be appreciated by those skilled in the art that although the invention has been described by way of example, with reference to one or more examples, it is not limited to the disclosed examples and alternative examples may be constructed without departing from the scope of the invention as defined by the appended claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle assembly comprising:
   one or more body frame components configured to define an interior of the vehicle assembly; and
   at least one window provided within corresponding apertures formed in or between the body frame components, the window comprising at least one first electrically conductive element, wherein the first electrically conductive element is configured to selectively permit transmission of electromagnetic waves between inside and outside of the vehicle interior,
   wherein each of the body frame components comprises at least one second electrically conductive element, the second electrically conductive element being configured to limit transmission of electromagnetic waves through the body frame component, and the first electrically conductive element is selectively connectable to the second electrically conductive element.

2. The vehicle assembly of claim 1, wherein the first electrically conductive element is one or more of:
   configured to form a mesh over an area of the window;

selectively connectable to one or more of the body frame components;

connectable to the body frame components at each edge of the aperture; or configured to attenuate electromagnetic waves passing through the window.

3. The vehicle assembly of claim 1, wherein the first electrically conductive element is configured to generate electromagnetic radiation in order to interfere with the transmission and reception of electromagnetic waves, and the vehicle further comprises an interference generator electrically connected to the first electrically conductive element, the interference generator configured to pass a current through the first electrically conductive element in order to generate the electromagnetic radiation.

4. The vehicle assembly of claim 3, wherein one or more of:

the first electrically conductive element is configured to generate electromagnetic radiation at a frequency that is substantially equal to a frequency of electromagnetic waves that it is desirable to interfere with; or the first electrically conductive element is configured to generate electromagnetic radiation at a frequency that induces electrical currents in electronic devices within the interior of the vehicle in order to disrupt their operation.

5. The vehicle assembly of claim 1, wherein the body frame components are electrically connected to one another.

6. The vehicle assembly of claim 1, wherein the body frame components comprise a door of the vehicle and one or more other body frame components, wherein the door and/or the other body frame components are configured such that the door is electrically connected to the other body frame components adjacent to the door, and the assembly further comprises one or more door seals provided between the door and one or more of the other body frame components, wherein the door seals comprise at least one third electrically conductive element configured to electrically connect the door to an adjacent body frame component.

7. The vehicle assembly of claim 1, wherein the vehicle further comprises an electromagnetic pulse generator configured to selectively emit a pulse of electromagnetic radiation or generate a magnetic field within the vehicle interior, and the body frame components and the window are configured to substantially prevent the electromagnetic radiation or magnetic field generated by the electromagnetic pulse generator passing outside of the vehicle interior.

8. The vehicle assembly of claim 1, wherein the vehicle further comprises:

an internal wireless transmitter-receiver configured to transmit or receive wireless signals within the vehicle interior and an external wireless transmitter-receiver configured to selectively transmit or receive the wireless signals outside of the vehicle interior such that the wireless signals can be relayed between the vehicle interior and exterior; and a controller, configured to determine which of the received wireless signals are to be transmitted by the internal and/or external wireless transmitter-receivers.

9. The vehicle assembly of claim 8, wherein the controller is configured to determine which of the received wireless signals are to be transmitted based on one or more of:

an intended recipient of the wireless signal;
an identity of a device that generated the wireless signals;
data contained within the wireless signals;
a communication protocol of the wireless signals;
authorization data received by the external wireless receiver; or
authorization data received by the internal wireless receiver.

10. The vehicle assembly of claim 1, wherein the first electrically conductive element comprises a heating element for the window.

11. The vehicle assembly of claim 1, wherein the first electrically conductive element comprises a shape memory alloy.

12. The vehicle assembly claim 1, wherein the vehicle further comprises a speaker configured to project audio noise within the interior of the vehicle, wherein the noise is configured to obscure voices of a vehicle occupant within an audio recording made within the vehicle interior.

13. The vehicle assembly of claim 12, wherein the speaker is configured to project the audio noise at a volume equal to or greater than a volume at which an occupant of the vehicle is speaking.

14. The vehicle assembly of claim 1, wherein the vehicle further comprises a body imaging device configured to scan an occupant of the vehicle and identify devices being carried by the occupant.

15. The vehicle assembly of claim 1, wherein the vehicle further comprises a wireless transmission detector provided within the vehicle interior and configured to inform an occupant of the vehicle if a wireless signal is detected within the vehicle interior.

16. The vehicle assembly of claim 1, wherein the window comprises an internal antenna provided at an internal surface of the window and an external antenna provided at an external surface of the window, wherein the internal antenna is selectively couplable to the external antennae, and the first electrically conductive element is configured to form a switch that selectively couples the internal antenna to the external antenna.

17. A vehicle assembly comprising:

one or more body frame components configured to define an interior of the vehicle assembly; and at least one window provided within corresponding apertures formed in or between the body frame components, the window comprising at least one first electrically conductive element, wherein the first electrically conductive element is configured to selectively permit transmission of electromagnetic waves between inside and outside of the vehicle interior;

wherein the body frame components and the window are electrically connected to one another, such that the body frame components and the window form an electrically conductive cage substantially surrounding the vehicle interior; and the body frame components and the window are configured such that gaps between members of the cage are less than or equal to a predetermined distance.

18. A vehicle assembly comprising:

one or more body frame components configured to define an interior of the vehicle assembly;

at least one window provided within corresponding apertures formed in or between the body frame components, the window comprising at least one first electrically conductive element, wherein the first electrically conductive element is configured to selectively permit transmission of electromagnetic waves between inside and outside of the vehicle interior; and a storage compartment within the interior of the vehicle assembly, wherein walls of the storage compartment comprise at least one fourth electrically conductive element substantially surrounding the storage compartment, wherein the fourth electrically conductive element is configured to substantially prevent electromagnetic radiation and magnetic fields from passing through the walls of the storage compartment.

19. A vehicle assembly comprising:

one or more body frame components configured to define an interior of the vehicle assembly; and at least one window provided within corresponding apertures formed in or between the body frame components, the window comprising at least one first electrically conductive element, wherein the first electrically conductive element is configured to selectively permit transmission of electromagnetic waves between inside and outside of the vehicle interior, wherein the first electrically conductive element is configured to change its shape under an external stimulus from a first shape, in which the first electrically conductive elements limits transmission of electromagnetic waves through the window, to a second shape in which the first electrically conductive element permits transmission of electromagnetic waves between inside and outside of the vehicle interior.

\* \* \* \* \*